Feb. 25, 1958  J. H. BOOTH  2,824,403
FISH HOOK SETTING DEVICE
Filed Sept. 15, 1955
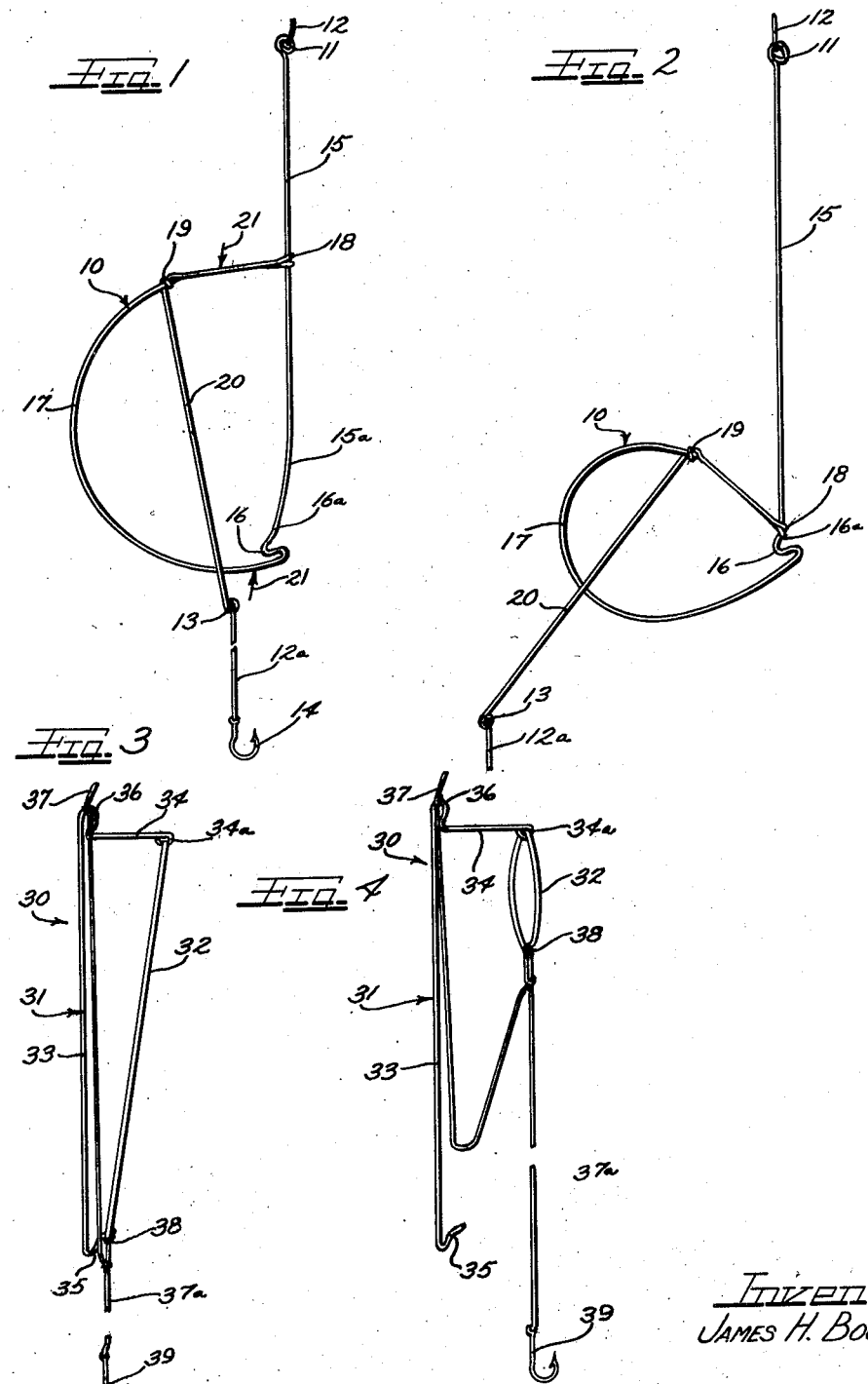
Inventor
JAMES H. BOOTH

United States Patent Office 2,824,403
Patented Feb. 25, 1958

2,824,403

FISH HOOK SETTING DEVICE

James H. Booth, Detroit, Mich.

Application September 15, 1955, Serial No. 534,466

5 Claims. (Cl. 43—15)

This invention relates generally to fishing tackle, and more particularly to a fish hook setting device.

Heretofore, many types of fish hook setting devices have been developed, but in each case, each device has been constructed of a plurality of individual parts. Moreover, many of the parts were complicated in structure and therefore expensive to manufacture.

Accordingly, it is an object of this invention to obviate the above named difficulties and provide a fish hook setting device having a minimum of parts which may be economically manufactured.

Another object of this invention is to provide an improved automatic means for setting a fish hook in the mouth of a fish after the fish has nibbled the hook.

A further object of this invention is to provide a fish hook setting device formed from a single piece of wire.

A further feature of this invention is to provide a fish hook setting device capable of hooking the fish by its automatic action mostly before the fisherman is aware that the fish has nibbled on the hook.

A further object of this invention is to provide a fish hook setting device which automatically hooks the fish when the hook is nibbled on by the fish, wherein the action is so fast that the fish is hooked firmly in the mouth and is not able to swallow the bait.

Other objects, features, and advantages of the invention will be apparent from the following detailed disclosure, taken in conjunction with the accompanying sheet of drawing, wherein like reference numerals refer to like parts, in which:

On the drawings:

Figure 1 is a side elevational view of a fish hook setting device constructed in accordance with the principles of the invention, illustrated in its unloaded or sprung form;

Figure 2 is a side elevational view of the device shown in Figure 1, but illustrating the device in preloaded or set position;

Figure 3 is a side elevational view of a modified form of the invention, showing the parts in set or cocked position; and Figure 4 is a side elevational view of the device shown in Figure 3, but illustrating the parts after the device has been operated.

As shown on the drawings:

Referring generally to Figures 1 and 2, which illustrate the preferred embodiment of the invention, a fish hook setting device generally indicated by the numeral 10, is comprised of a single and continuous length of wire bent into the shape as shown. The wire may be of any suitable material, so long as restorative resilience may be endowed in certain portions, but preferably of spring steel.

At the upper end of the device 10, a connecting point 11 is formed as a bent eye or loop which accommodates the line 12 leading to the fish pole of the user. This end is also one end of the wire. At the lower extremity of the device and at the other end of the wire, a similar bent eye or loop 13 is formed which accommodates the line 12a leading to the fish hook assembly 14.

Referring generally to the sprung or unloaded form in Figure 1, from the bent eye or loop 11, the wire extends downwardly to form a substantially straight portion 15 and having a substantially curvate portion 15a at the lower end thereof. A reverse bend is then made in the wire to define an indented portion 16. Hinged to the lower end of the indented portion 16 is a substantially U-shaped or semi-circular shaped section 17 defining the resilient or spring portion of the device.

The free end of the wire extending from the top end of the spring 17 is then bent around the straight section 15 to form a loop or eyelet 18 for maintaining the upper end in slidable relationship with the straight section 15 and defining a trigger member. The wire is then run back along a portion of the upper arm of the U-shaped spring 17 to a point slightly spaced from the trigger 18 where it is wound once or twice around the arm at 19. The end of the wire is then extended substantially downwardly, but at a slight angle to the straight section 15 to form a second straight section 20 which terminates in the eyelet or loop 13.

In operation, the device 10 is set or preloaded by squeezing the wire between two fingers at the approximate points marked by the arrows 21, 21 until the trigger or loop 18 touches the bottom of the indented portion 16. Upon removal of the fingers, the loop 18 returns slightly to be engaged by the ridge 16a as seen in Figure 2. At this point, the loop 18 is retained adjacent the idented portion 16 at the point 16a. It will then be noted that the eyelet or loop 13 is spaced at a greater distance from the eyelet or loop 11 and that the spring 17 takes a substantially ovate shape.

Should it be desired to adjust the device 10 so that a light or heavy pull is required to trigger the release of the loop 18 from the set position, it is only necessary to decrease or increase the curvature of the curvate portion 15a of the straight section 15. That is, when the device is in the sprung or released position, as shown in Figure 1, the lower portion of the section 15 is generally curvate as indicated at 15a. An increase in curvature of the portion 15a prior to setting of the device would necessitate a greater pull or jerk on the line 12a to release the loop 18 from its locked position when the device is set. For example, in swift water it would be preferable that a greater pull on the line 12a be necessary to trigger the device, and by increasing the curvature of the straight portion 15 and 15a, the desired result will be obtained. While in still water, it is preferable that only a slight pull will trigger the device where the entire section 15 would be adjusted to be substantially straight prior to setting the device.

After the line is cast or allowed to sink into the water, the device remains in set or loaded position until a fish strikes or nibbles on the hook 14. When the fish nibbles or strikes the hook 14, the line 12a is quickly pulled downwardly with respect to the device 10 and this pulling effect exerts a downward movement on the end of the second straight section 20 which, in turn, exerts a downward movement on the spring member 17. The downward movement on the spring 17 causes the opposite sides of the trigger or loop 18 to bend away from the opposite points on the ridge section 16a thereby freeing the loop 18 and allowing it to jerk upwardly by virtue of the force of the spring 17. This fast upward movement of the looped end of the spring 17 raises likewise and imparts a fast upward movement of the second straight section 20 and the line 12a connected to the hook 14, thus imparting a twitch or jerk to the line 12a for setting the hook firmly in the mouth of a fish.

A different form of the invention is illustrated in Figures 3 and 4, generally indicated by the numeral 30, and includes generally a relative stiff wire member 31 and an elastic or resilient element 32.

The wire member 31 includes a straight section 33 having a pair of substantially laterally offset arms 34 and 35 at each end thereof.

Due to the upper arm 34 being offset, an eyelet 36 is formed which accommodates the line 37 leading to the fish pole of the user. At the free end of the arm 34 a loop 34a is formed for attaching thereto one end of the elastic element 32.

The elastic element 32 may be in the form of a rubber band of any conventional type as illustrated, a spring, or any other suitable elastic element. The lower end of the elastic element 32 accommodates the line 37a at 38 which leads to a conventional fish hook 39. It is noted that the fish line 37 need not be cut to secure the fish hook setting device 30 thereto. It is only necessary to secure the line at one point to the loop 36 and at another point spaced sufficiently downwardly from the first point to the elastic element 32.

In operation, the fish hook setting device 30 is set or cocked merely by stretching the elastic element and placing the free end thereof over the lower arm 35 which is slightly inclined in the direction of the upper arm 34 as seen in Figure 3. When the fish nibbles or strikes the hook 39, the free end of the elastic element 32 will be displaced from the lower arm 35 allowing the force of the elastic element to immediately jerk the line 37a upwardly and hook the fish in the mouth. The resilient element 32 being attached to the end of the laterally extending arm 34, and being shorter than the "shunt" section of the fish line, will pivot the entire device about the junction point of the section 33 and the upper arm 34 when tension is applied to the hook line.

From the foregoing, it will now be seen that the present invention provides a fish hook setting device having a minimum of parts, and which may be therefore economically manufactured.

It will be understood that modifications and variations may be effected without departing from the scope of the novel concepts of the present invention, but it is understood that this application is to be limited only by the scope of the appended claims.

I claim as my invention:

1. In a fish hook setting device, a one-piece inverted substantially L-shaped member having a short rigid laterally extending leg adjacent the top thereof and a long vertical depending leg extending downwardly therefrom, means at the junction of said legs for connecting the upper end of said member to a fishing line leading to a fishing pole, attaching means at the outer end of said short leg, a resilient member having one end secured to said attaching means and a free end adapted to be connected to a fishing line leading to a hook, means adjacent the bottom of said long vertical depending leg for releasably retaining the free end of the resilient member to stretch the resilient member between the free ends of said legs, and a loop of fish line connecting said means at the junction of the legs to the free end of the resilient member, said loop of fish line being longer than said resilient member when it is dormant, whereby a slight pull on the hook line will release the resilient member from the retaining means adjacent the bottom of said long leg and the L-shaped member will pivot at the junction of the legs to swing the long leg away from the loop of line to accommodate tensioning of the loop when tension is applied to said hook line while said resilient member pulls downwardly on said short leg without being substantially tensioned.

2. A fish hook setting device comprising a one-piece substantially rigid inverted substantially L-shaped wire member having a long vertical depending leg and a short lateral extending leg adjacent the upper end terminating in a non-resilient hitch, and attaching means at the junction of said legs for connecting the upper end of said wire member to a fish line leading to a fishing pole, an elongated loop of resilient material attached at its upper portion to said hitch and with its free bottom portion adapted to be connected to a fish line leading to a hook, rigid retaining means connected with and adjacent the bottom of said long vertical depending leg for releasably retaining the free bottom portion of the loop of resilient material to stretch said loop of resilient material between it and said hitch, a section of fish line connecting said attaching means at the junction of said legs to the free bottom portion of said loop of resilient material, said loop of resilient material when dormant being shorter than the length of said section of fish line, whereby a slight pull on the hook line will release the loop of resilient material from the retaining means adjacent the bottom of said long leg and the entire L-shaped member will pivot at the junction of the legs to swing the lower portion of said long leg outwardly away from the section of line leading to said hook line when tension is applied to said hook line causing the resilient loop to pull upon the end of the laterally extending leg.

3. A fish hook setting device comprising a one-piece stiff wire member embodying a straight vertical leg section, a laterally extending arm portion at the upper end thereof and forming an eyelet therewith, said arm portion terminating in a loop, a second laterally extending arm portion at the lower end of said vertical leg section, a resilient member attached at one end to said loop and capable of being tensioned and temporarily held by said lower laterally extending arm portion, said resilient member being a rubber band, a fish line leading to a fish pole attached to said eyelet and the lower end of said resilient member, said resilient member and said fish line adapted to be attached to a line leading to a hook, whereby a slight pull on the hook line will release the resilient member from said lower arm portion and the one-piece wire member will pivot at said eyelet to swing the vertical leg outwardly from this vertical position away from said fish line by the force applied to the end of the arm by said resilient member.

4. A fish hook setting device which comprises a one-piece wire member having a vertical section and a laterally extending arm at each end thereof, the upper of said arms forming a line securing eyelet means at the junction with said vertical section and terminating in a loop, a resilient element connected at one end of said loop and capable of having the other free end temporarily held by the lower arm, a loop of fish line leading to a pole attached to said eyelet means, a shunt fish line connected between said eyelet and said free end of said resilient element, said resilient element when dormant being shorter than said shunt fish line, said free end of said resilient element attached to a line leading to a hook, whereby a jerk on the hook line will release said resilient element from said lower arm and the resilient element will pivot the one-piece wire member about said eyelet means.

5. A fish hook setting device which comprises a stiff one-piece wire member having a straight vertical section, a pair of arms laterally off-set from each end thereof, the upper arm of said arms being longer than the lower arm, the upper arm forming an eyelet at the junction with said straight section and terminating in a hitch, said eyelet adapted to be attached to a fish line extending from a pole, an elastic member attached at one end to said hitch and adapted to have a fish line with a hook thereon secured to the other end, the length of said elastic member normally being shorter than the distance between said arms, said fish line end of said elastic member capable of being temporarily retained by said lower arm for tensioning said elastic member, whereby said elastic member will be released from the lower arm in response to a predetermined movement of said fish hook line connected thereto, and a shunt loop of fish line secured at one end to said eyelet and at its other end with the lower end of said elastic member and said line with said hook, said elastic member being shorter than said shunt loop, whereby a jerk on the line will release said elastic member from said lower arm and pivot the one-piece wire member about the eyelet at the junction of the straight vertical section and the upper arm and swing the vertical section away from the fish line under tension.

References Cited in the file of this patent

UNITED STATES PATENTS

| | | |
|---|---|---|
| 677,655 | Gary | July 2, 1902 |
| 1,681,407 | Howell | Aug. 21, 1928 |
| 2,286,743 | Ladd | June 16, 1942 |
| 2,526,980 | Turchan | Oct. 24, 1950 |
| 2,631,399 | Sowa | Mar. 17, 1953 |

FOREIGN PATENTS

| | | |
|---|---|---|
| 14,386 | Norway | Mar. 4, 1905 |
| 171,951 | Austria | July 25, 1952 |
| 690,525 | France | June 23, 1930 |
| 1,097,052 | France | Feb. 9, 1955 |